Sept. 24, 1946. P. SCHON 2,408,098
DUAL MOTOR CONTROL
Filed Sept. 14, 1942
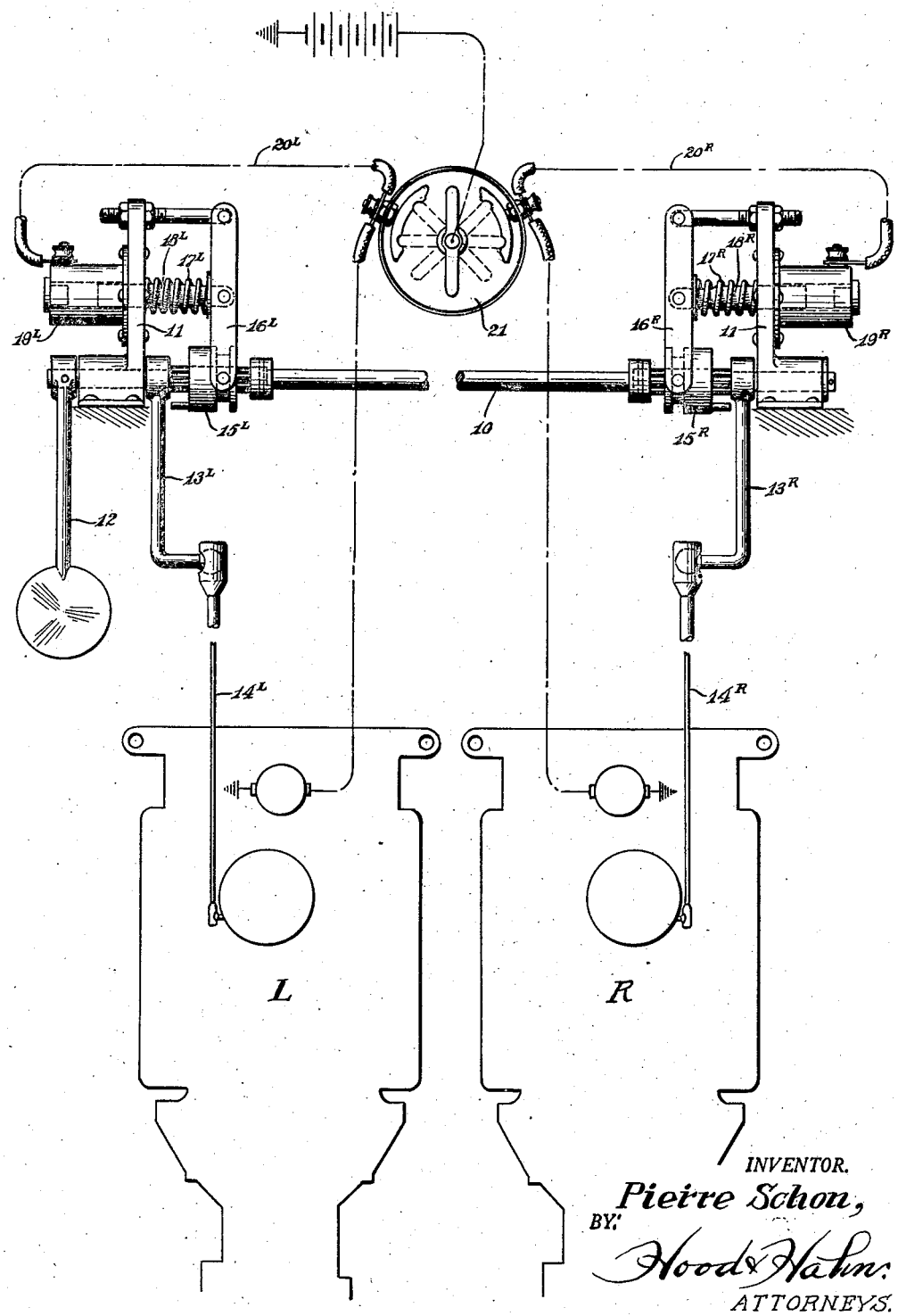
INVENTOR.
Pierre Schon,
BY:
Hood & Hahn
ATTORNEYS.

Patented Sept. 24, 1946

2,408,098

UNITED STATES PATENT OFFICE 2,408,098

DUAL MOTOR CONTROL

Pierre Schon, Indianapolis, Ind., assignor to Marmon-Herrington Company, Inc., Indianapolis, Ind., a corporation of Indiana Application September 14, 1942, Serial No. 458,288

4 Claims. (Cl. 60—97)

Certain types of motor vehicles are provided with two engines for supplying power to the traction wheels.

The object of my present invention is to provide an improved and simple mechanism for controlling the operation of such engines, selectively or collectively.

The accompanying drawing illustrates my invention as applied to two internal combustion engines such as are commonly used in motor vehicles.

The drawing is a distorted elevation of my improved mechanism, together with diagrammatic additions indicating the engines, their carburetors, and ignition circuits.

In the drawing 10 indicates a pedal shaft journalled in suitable standards 11, 11, supported by the usual floor board, or otherwise, and provided with foot pedal 12 and biased toward low speed position in the usual manner. Journalled on shaft 10 are two arms 13R, 13L, the free end of each of which is connected, directly or indirectly, with the control members of one of two independent engines R and L, said control members, in the illustrated embodiment, being the control arms 14R and 14L of the carburetors of the right and left engines.

Splined to shaft 10, adjacent arms 13R, 13L, are clutches 15R and 15L engaged, respectively, by levers 16R, 16L and biased in one direction, preferably out of engagement with their respective arms 13R, 13L, by springs 17R, 17L. Associated with levers 16R, 16L, respectively, are the magnetic plungers 18R, 18L of solenoids 19R, 19L with energizing circuits 20R, 20L including a switch 21 by means of which the clutches, either or both, may be clutched to the associated arms 13R, 13L. Switch 21 also controls the ignition circuits, so that said circuits are only energized when the appropriate clutch 15R or 15L is in active position.

By this arrangement, manipulation of shaft 10 may serve to selectively operate, or leave undisturbed, either or both of the controlling means directly controlling the supply of fuel or energy to the engine.

It will be readily understood that means, such as pressure-responsive or manually-responsive, for shifting the clutches 15R, 15L may be substituted for the solenoids without departing from my invention.

I claim as my invention:

1. Means for selectively controlling two independent power units which comprises, a shaft having means by which it may be oscillated, two arms journalled on said shaft and each connectible to control means of a power unit, two clutch elements independently splined on said shaft, and means including a single control element by which said clutch elements, either or both, may be selectively associated with said arms.

2. Means for selectively controlling two independent power units which comprises, a master control element, two control elements, one for each power unit, a clutch element interposed between the master control and one of said two unit control elements, a second clutch element interposed between the master control element and the other of said two control elements, and means including a single control element by which said two clutch elements, either or both, may be independently shifted to and from clutching position.

3. The combination with two independent power sources each with a fuel-control element, a primary control element, a connection between said primary control element and one of said fuel-control elements and comprising separable clutching means, a connection between said primary control element and the other of said fuel-control elements and comprising separable clutching means, two clutch manipulating means one for each of said separable clutching means, and a single manual-controllable means by which either or both said clutch-manipulating means may be actuated to selectively couple or dissociate either or both said clutching means.

4. The combination with two independent power sources each with a fuel-control element, a primary control element, a connection between said primary control element and one of said fuel-control elements and comprising separable clutching means, a connection between said primary control element and the other of said fuel-control elements and comprising separable clutching means, two clutch manipulating means one for each of said separable clutching means, two solenoids each controlling only one of said clutch manipulating means, energizing circuits for said solenoids comprising separable contacts, and a single contact-controlling element by which either or both said solenoids may be selectively energized or deenergized.

PIERRE SCHON.